United States Patent [19]

Munson

[11] Patent Number: 4,530,248
[45] Date of Patent: Jul. 23, 1985

[54] DYNAMOMETER HAVING TORQUE AND HORSEPOWER READOUT

[76] Inventor: Chester L. Munson, 1709 35th St., Kenosha, Wis. 53140

[21] Appl. No.: 522,646

[22] Filed: Aug. 12, 1983

[51] Int. Cl.³ ............................. G01L 3/22; G01L 3/24
[52] U.S. Cl. ................................ 73/862.17; 73/862.28; 73/DIG. 3
[58] Field of Search ........... 73/862.28, 862.17, 862.18, 73/DIG. 3

[56] References Cited

U.S. PATENT DOCUMENTS

| | | | |
|---|---|---|---|
| 2,585,475 | 2/1952 | Lee et al. ........................ | 73/862.17 |
| 2,754,464 | 7/1956 | Wizenez et al. ................ | 73/DIG. 3 |
| 4,099,238 | 7/1978 | Suzuki ............................ | 73/DIG. 3 |
| 4,157,658 | 6/1979 | Grice, Jr. ........................ | 73/862.28 |
| 4,203,046 | 5/1980 | Homann et al. ................ | 310/105 X |

Primary Examiner—Charles A. Ruehl
Attorney, Agent, or Firm—Bayard H. Michael

[57] ABSTRACT

The dynamometer has a fixed frame in which a Hall effect generator measures the flux density at a location indicative of the flux in the gap between the rotor and the inductor rings. The gap flux density is influenced by the flux induced by the field and the opposing emf generated in the rings as the rotor rotates. The Hall voltage $H_V$ is related to and substituted for the flux density B in the formula Torque $$= \frac{B^2 f}{r + sf}$$

where r and s are constants proportional to eddy resistance and inductance and f is the frequency in cycles per second. The Hall voltage and a speed pulse signal are fed into computer means to provide a direct readout for torque, horsepower and speed.

4 Claims, 3 Drawing Figures

DYNAMOMETER HAVING TORQUE AND HORSEPOWER READOUT

BACKGROUND OF THE INVENTION

The inductor (eddy current) dynamometer is a device used for measuring mechanical horsepower. The machine is fundamentally an electric generator and has a field member which produces a magnetic field through which the conductors on the armature are rotated as the dynamometer is driven by the prime mover under test. The conductors on the armature cut through the magnetic field and a current is generated. The generation of the current in the dynamometer produces a counter torque that opposes the torque of the prime mover driving the dynamometer. This counter torque is traditionally measured by an arm projecting from the dynamometer frame and acting on a scale or other transducer resulting in a reading of a force which, multiplied by the distance from the center of the dynamometer, gives the torque. Torque coupled with the speed of the dynamometer gives the horsepower according to well-known formulas.

Dynamometer design and determination of horsepower through use of a dynamometer has remained quite static for many years. The methods do not provide an instantaneous reading of the horsepower.

SUMMARY OF THE INVENTION

This invention provides a dynamometer in which a Hall effect generator measures the flux density induced by the field coil. The generator is mounted in a location indicative of the flux density at the air gap. The resulting signal from the Hall generator is combined with a tachometer (speed/rpm) signal to produce, with the aid of a microprocessor, a direct reading of horsepower. If desired, the device can also provide direct readings of torque and speed and can control the dynamometer and prime mover to maintain constant horsepower or torque or other variable or to follow a program.

With an inductor dynamometer, the magnetizing action of the field under load has an offsetting effect of weakening the flux field produced by the exciting field coil. Since this field weakening is proportional to the armature current which is, in turn, proportional to the counter torque measured by the usual dynamometer, it follows that variations in the dynamometer flux field proportionately reflect a variation in the counter torque. This is the basis of the present invention. A number of years ago, Harold V. Green (deceased), evolved a formula for torque as follows:

$$T = \frac{B^2 f}{r + sf}$$

where:
T—is torque,
B—is the flux density at the air gap,
f—is the rotational frequency in cycles per second.
r—is a constant proportional to the effective eddy resistance, and
s—is a constant proportional to the effective eddy inductance.

$$f = \frac{RPM \times number\ of\ rotor\ teeth\ per\ pole}{60}$$

This formula has had very limited use in designing eddy current machines. The primary use of the formula has been to develop a family of performance curves for a dynamometer after it had been built and tested to permit determination of the constants in the formula. The formula demonstrates, however, that the flux density B affects torque as does frequency. Frequency, is a function of speed. Therefore, both flux density and speed must be factored into torque determination and with speed being known horsepower can then be calculated.

According to this invention, a Hall effect generator measures the field flux density which is proportional to the flux density at the air gap. Therefore, the Green formula can be used.

DETAILED DESCRIPTION OF THE DRAWINGS

Figure 1:
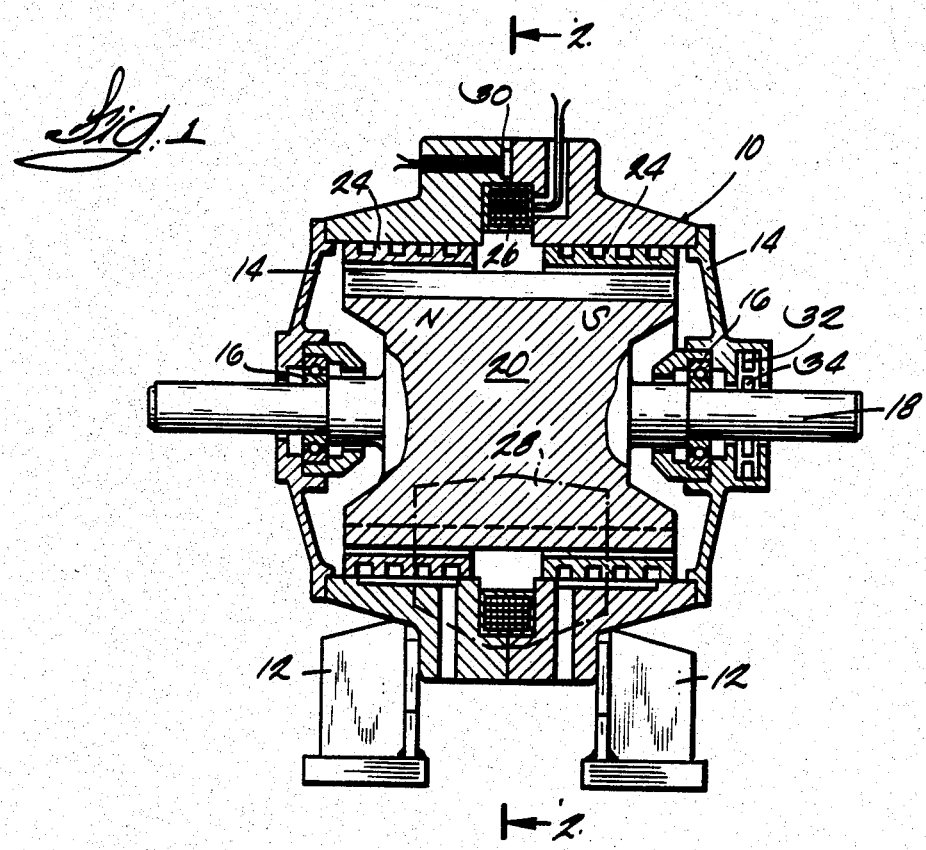
FIG. 1 is a vertical, longitudinal section through a dynamometer incorporating the present invention.
Figure 2:
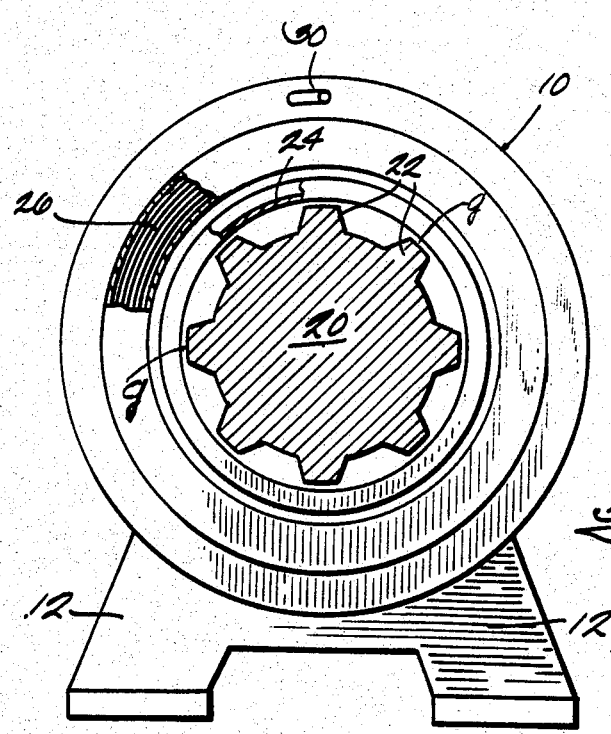
FIG. 2 is a vertical section taken on line 2—2 of FIG. 1.

The typical dynamometer today has a frame mounted in bearings so as to be able to rotate and rotation is resisted by an arm resting on a scale or some other transducer to give a force reading which, multiplied by the distance from the center, will give torque and this can be factored into the horsepower formula when speed is taken into account. As shown in FIGS. 1 and 2, the present design does not have a rotating frame. The frame is vertically split (FIG. 1) to provide two halves to simplify machining operations. Each half of the frame is provided with non-magnetic feet 12 which are designed to be bolted or otherwise fixed in place. There will still be torque present in the frame but the torque is not measured in the usual way.

Each end 14 of the dynamometer frame is provided with a bearing assembly 16 supporting the rotor shaft 18 and the rotor 20. The rotor is a two pole multitooth rotor and either end of the shaft 18 can be driven by the prime mover. Each tooth 22 is separated from the eddy current ring or inductor 24 by an air gap "g". The eddy current or inductor rings 24 have conventional cooling water channels.

The field coil 26 is the source of the magnetic flux represented by B in the torque formula given above. The flux path is illustrated by the dashed line 28 in the lower portion of FIG. 1. As the rotor is rotated by the prime mover the field is swept by the rotor teeth and emf is generated in the inductor ring 24. A counter torque appears in rotor 20 and this opposes the torque of the prime mover. The feet 12 of the dynamometer are non-magnetic to minimize flux leakage.

The split housing 10 for the dynamometer affords a convenient way to machine a cavity for the Hall generator 30 but the generator need not necessarily be located at that point. Since the torque formula has constants it is a simple matter to adjust the constants to compensate for other locations of the Hall generator. It need only be placed where it can respond to the flux density (induced by the field coil) in a way related to the flux density at the air gap "g".

Since it is desired to read speed as well as flux density the right-hand end of the housing (FIG. 1) is provided with a coil type pulse generator 32 in close proximity to the permanent magnet or other device 34 fixed to the shaft 18 to give a pulse for each revolution.

Figure 3:
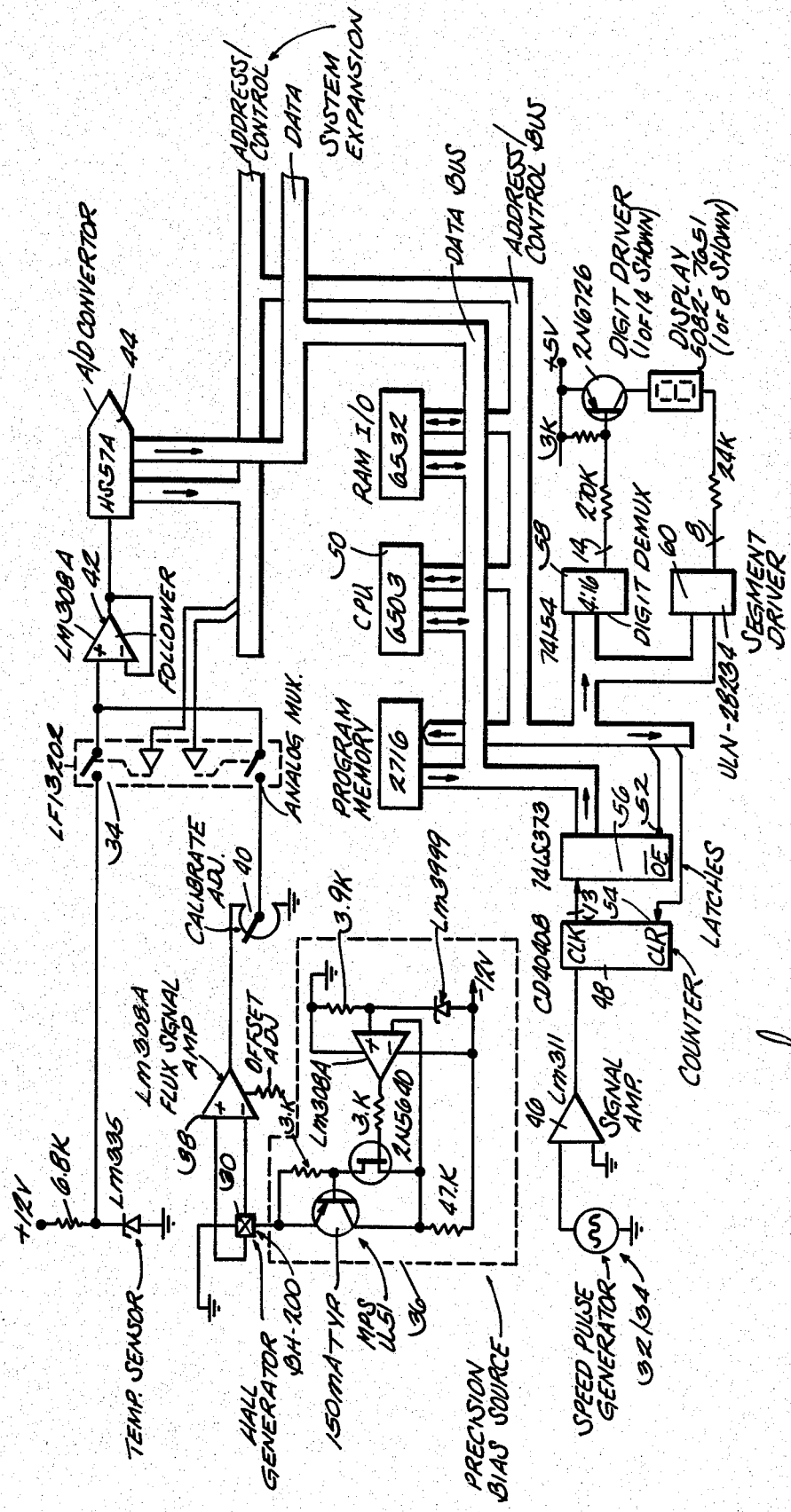
FIG. 3 is a schematic diagram showing the manner in which the signal from the Hall generator is processed and integrated with temperature and speed signals to provide the desired readout of horsepower.

With this arrangement, the pulse generator 32 can obtain a reading indicative of speed and the Hall generator can provide a reading indicative of flux density. A temperature sensor can be embedded in the dynamometer frame adjacent the Hall generator to respond to substantially the same temperature as the Hall generator. The temperature sensor is not critical since the Hall generator is only slightly affected by temperature, but, for the best accuracy one would use a temperature sensor such as the LMCC-5 (or similar) shown on the schematic diagram of FIG. 3. This is an avalanche device giving a ten millivolt/C° change and its output feeds into the analog microprocessor 34. Hall generator 30 is biased by the precision bias source 36 and the output of the Hall generator 30 is fed into the op amp 38 to amplify the signal to a usable value.

The Hall output voltage is a product of the control current and the magnetic flux density in the gap. The offset adjustment on the op amp 38 permits the op amp to be zeroed in the absence of the magnetic field to eliminate errors due to the residual magnetism in the dynamometer and also to compensate for electrical errors in the manufacture of the Hall cell and the op amp 38 itself. The output signal from the op amp 38 passes through the calibrating potentiometer 40 and is then supplied to the microprocessor 34. The switches shown schematically in the mircoprocessor 34 are representations of field effect transistors. The microprocessor output is fed to a follower op amp 42 having its output connected to the analog-to-digital converter 44.

The tachometer or speed pulse generator 32, 34 is connected to a signal amplifier 46 and that output is connected to the clock input of the counter chip 48 which counts the number of shaft rotations in a one second period. The one second gate is provided by the central processing unit 50 to the control bus connected to the "output enable" pin 52 of the latch chip 56 and the clear pin 54 on the counter chip. When the time base detects a period of one second after reset the latch chip 56 releases the count from the counter 48. The microprocessor 50 then commands the latch 56 to pass the digital count on to the microprocessor by way of the data bus by sending a signal from the control bus to "output enable" pin 52.

The temperature and speed are sampled (read) once every second and the values are held in the read/write memory of the CPU 50. The magnetic flux is sampled every twenty milli-seconds (50/second), and these quantities are then used to compute torque using the "Green" formula (above) with "B" represented by the Hall generator voltage "$H_v$" and factoring in a temperature correction factor "$K_t$". Thus, the formula processed by the computer is:

$$T = \frac{K_t (H_v) 2 f}{r + sf}$$

Test readings of the Hall generator show $H_v$ drops as the frequency "f" increases and the consequent induced emf in the inductor opposes the field flux. The values for "r" and "s" are quite uniform over the usable ranges of low carbon steel suitable for inductors. For example, a machine having 1 inch wide rotor teeth on a pi pitch $$s = \frac{1}{.0000509 \, ad}$$

where a = tooth face area
and d = rotor diameter in inches
and r = 75.015s

The values can be determined with certainty by using accurate test data from a proven dynamometer design.

The resulting (computed) torque value is held in the memory and is also used to compute horsepower using the following formula:

$$Hp = \frac{T(\text{RPM})}{5250. \text{ (precisely 5252)}}$$

The horsepower is also saved in memory. The torque and horsepower computations are made every twenty milliseconds after reading the new flux value. The sampling rate of fifty per second makes it possible to use torque and horsepower values in conjunction with the current controller in a responsive control system for controlling the dynamometer as a torque controller or a horsepower controller rather than just controlling the field current. These potentials are illustrated schematically in FIG. 3 by the term "system expansion" at the right of the figure. Torque and horsepower values are output to an output port of the microprocessor for use in controller applications.

Once every second, after reading the new speed and temperature values, binary numbers are converted to binary coded decimals and the speed, torque and horsepower are displayed on the numeric display. The control can be programmed to display the temperature in a flashing mode if the temperature is above 90° C., for example, indicating an over-temperature condition. When the temperature reaches 100° C. the field excitation current can be interrupted. The trip points can be changed to accommodate specific machine design.

Reverting now to the display readout, the output signal from the control bus is supplied to a four-to-sixteen digit demux chip 58 expanding the four line input to a sixteen line output with each output connected to the base of a transistor constituting a digit driver. A signal also goes to the segment driver chip 60 having eight Darlington connected transistors each decoding the signal and providing an output connected to drive the appropriate segment in the display.

By sensing the flux density and speed and feeding the signals into an appropriate computer (microprocessor) continuous readings of horsepower, torque and speed can be provided. There are other circuits capable of accomplishing the desired ends. The essence of this sensed flux density and speed to determine horsepower and torque on a continuous and virtually instantaneous basis. The dynamometer is unique—it has a fixed frame which simplifies plumbing (for cooling water) and wiring as opposed to prior designs which always had a rotatable frame.

As indicated above, the calculated horsepower, torque and speed signals can also be fed into further computing stages to derive control signals to be fed back to control the prime mover to operate in a continuous horsepower, or torque, or speed mode as other factors are varied or the system extension can operate the prime mover through a programmed variation of any of the factors. All these advantages and possibilities can be attributed to the recognition that the sensed flux density (through use of the Hall generator) is a clear indication of torque (and horsepower when coupled with a speed reading). Excitation of the field coil can be controlled by the system extension or can be controlled manually.

It is claimed:

1. An inductor dynamometer having a non-rotating frame, a field coil fixed in the frame, an inductor ring fixed in the frame, a rotor mounted in the frame for rotation inside said ring and spaced from the ring by a gap, means responsive to flux density to develop a control signal indicative of the flux density at said gap, means for developing a control signal indicative of the rotational speed of the rotor, computer means for processing both said control signals to provide an output indicating the horsepower being absorbed by the dynamometer, said computer means also providing outputs indicating the torque and speed of the dynamometer, torque being calculated in said computer means according to the following formula:

$$T = \frac{B^2 f}{r + sf}$$

where:

B is the flux density at the gap f is rotational frequency in cycles per second r is a constant proportional to the effective resistance of the inductor ring, and s is a constant proportional to the effective inductance of the inductor ring.

2. An inductor dynamometer according to claim 1 in which horsepower is computed as $$Hp = \frac{T(RPM)}{5250}.$$

3. An inductor dynamometer according to claim 2 in which the means responsive to flux density is influenced by ambient temperature and including.

means developing a control signal responsive to temperature ambient to the flux responsive means.

said temperature control signal being supplied to said computer means to compensate the torque calculation for the temperature characteristic of the flux responsive means.

4. An inductor dynamometer according to claim 3 including digital readout means for torque, horsepower and speed.

* * * * *